United States Patent
Klaren

[11] Patent Number: 6,073,682
[45] Date of Patent: Jun. 13, 2000

[54] APPARATUS FOR CARRYING OUT A PHYSICAL AND/OR CHEMICAL PROCESS, SUCH AS A HEAT EXCHANGER

[75] Inventor: Dick Gerrit Klaren, LP Hillegom, Netherlands

[73] Assignee: Klarex Beheer B.V., Nijkerk, Netherlands

[21] Appl. No.: 09/038,379

[22] Filed: Mar. 11, 1998

[30] Foreign Application Priority Data

Mar. 12, 1997 [NL] Netherlands .......................... 1005517

[51] Int. Cl.⁷ .................................................. F28D 13/00
[52] U.S. Cl. ................... 165/104.16; 165/108; 165/119; 110/245; 422/147; 422/145
[58] Field of Search ............................... 165/104.16, 108, 165/119; 110/245; 422/145, 147

[56] References Cited

U.S. PATENT DOCUMENTS

| | | |
|---|---|---|
| 4,246,231 | 1/1981 | Figler et al. . |
| 4,289,729 | 9/1981 | Meyers et al. . |
| 4,292,023 | 9/1981 | De Feo et al. . |
| 4,378,744 | 4/1973 | DeFoe et al. . |
| 4,398,594 | 8/1983 | Klaren . |
| 4,426,958 | 1/1984 | Hosek et al. . |
| 4,554,963 | 11/1985 | Goodwin et al. . |
| 4,615,382 | 10/1986 | Klaren . |
| 4,672,918 | 6/1987 | Engstrom et al. . |
| 4,716,856 | 1/1988 | Beisswenger et al. . |
| 4,781,574 | 11/1988 | Taylor . |
| 4,955,295 | 9/1990 | Abdulally . |
| 5,033,413 | 7/1991 | Zenz et al. . |
| 5,141,708 | 8/1992 | Campbell, Jr. et al. . |
| 5,159,886 | 11/1992 | Schaub et al. . |
| 5,205,350 | 4/1993 | Hirsch et al. . |
| 5,218,932 | 6/1993 | Abdulally . |
| 5,308,585 | 5/1994 | Stroder et al. . |
| 5,314,611 | 5/1994 | Cetinkay . |
| 5,343,830 | 9/1994 | Alexander et al. . |
| 5,526,775 | 6/1996 | Hyppänen . |
| 5,601,039 | 2/1997 | Hyppänen . |
| 5,706,884 | 1/1998 | Klaren ................................ 165/104.16 |

FOREIGN PATENT DOCUMENTS

| | | |
|---|---|---|
| 65 332 | 11/1982 | European Pat. Off. . |
| 278 262 | 8/1988 | European Pat. Off. . |
| 413 611 | 2/1991 | European Pat. Off. . |
| 1350734 | 12/1963 | France . |
| 21 52 401 | 4/1972 | Germany . |
| 34 32 864 | 3/1986 | Germany . |
| 2 087 534 | 5/1992 | United Kingdom . |
| WO 94/24507 | 10/1994 | WIPO . |

OTHER PUBLICATIONS

Copy of PCT Search Report.

*Primary Examiner*—Christopher Atkinson
*Attorney, Agent, or Firm*—Merchant & Gould P.C.

[57] ABSTRACT

An apparatus for carrying out a physical and/or chemical process, such as a heat exchanger, including a reservoir in which a series of riser pipes (2) are arranged. Disposed in the reservoir (1) is a fluidized bed of granular material. The apparatus includes means for circulating the particles of the fluidized bed through the riser pipes (2), which means include a downcomer (15) arranged outside the reservoir (1), this downcomer being closed off at the bottom end by an inclined closing plate (16). Above the closing plate (16), via a bypass line (17), a part of the medium to be treated is fed to the particle bed resting on the plate (16).

12 Claims, 3 Drawing Sheets

APPARATUS FOR CARRYING OUT A PHYSICAL AND/OR CHEMICAL PROCESS, SUCH AS A HEAT EXCHANGER

This invention relates to an apparatus for carrying out a physical and/or chemical process, such as a heat exchanger, comprising a reservoir provided with upwardly directed tubes accommodated, at top and bottom ends thereof, in tube plates, the tubes being in open communication with a top box and a bottom box, at least one distribution plate being arranged in the bottom box for supporting a fluidized bed of granular material maintainable in a quasi-stationary, fluidized condition by a medium to be treated or heated which is supplied via the bottom box and which flows through the tubes, the apparatus further comprising means for feeding fluidized bed particles back from the top box, in the form of a downcomer arranged outside the reservoir and connected, at the top end thereof, to the top box by a separating device, the bottom end of the downcomer being communicable, through switching on and off, with the bottom box of the reservoir.

Such an apparatus is known from EP-B-0,694,152. In the apparatus known from FIG. 1 of that publication, the downcomer opens into a reservoir of a greater diameter than the downcomer. Above a distribution plate mounted in this reservoir, a fluidized condition of the fluidized bed particles supplied from the downcomer is realized. These fluidized bed particles are carried by the medium (liquid) supplied via the underside of the reservoir, along the outside of the downcomer extending into the reservoir and via a connecting line from the reservoir to the bottom box of the heat exchanger, where subsequently again a uniform distribution of the fluidized bed particles over all tubes is realized. In practice, it has been found that because of the maintenance of a fluidized condition in the reservoir and the greater diameter of that reservoir in comparison with that of the downcomer, a rather great pressure loss occurs and quite a lot of liquid must be fed to the reservoir to make it possible to transport a certain amount of fluidized bed particles. This is not desirable because in that case, too little liquid remains available for fluidization of the fluidized bed particles directly above the bottom distribution plate in the bottom box of the heat exchanger, so that problems may arise in respect of the uniform distribution of the fluidized bed particles over the tubes of the heat exchanger.

The object of the invention is to provide an apparatus of the above-described type, whereby the drawback mentioned is obviated and the design of the apparatus is considerably simplified.

According to the invention, this object is achieved by providing an apparatus of the above-described type in which the downcomer is closed off at the bottom end by an inclined closing plate, and the discharge line between the downcomer and the bottom box is connected to the downcomer at a short distance above the lowest point of the closing plate, while a line branched off from the medium feed line is present for feeding a medium substream to the particle bed resting on the closing plate, in the direction of the mouth of the discharge line.

By thus designing the bottom end of the downcomer, there is obtained a uniform transport, supported by the thrust of the particles in the downcomer and the medium substream supplied, of the fluidized bed particles to the bottom box of the heat exchanger, even at a slight liquid flow and a slight pressure difference.

The branch line preferably extends in downward direction into the downcomer at a sharp angle with the horizontal plane, at a short distance above the highest point of the closing plate.

For creating a so-called "live bottom" in the lower end of the downcomer, preferably a lance is present, drivable by vibration motors, which lance extends from the underside through the closing plate into the downcomer, and is provided with cross-rods for guiding the lance in the downcomer.

Embodiments of the apparatus according to the invention are further elucidated with reference to the drawings, wherein.

Figure 1:
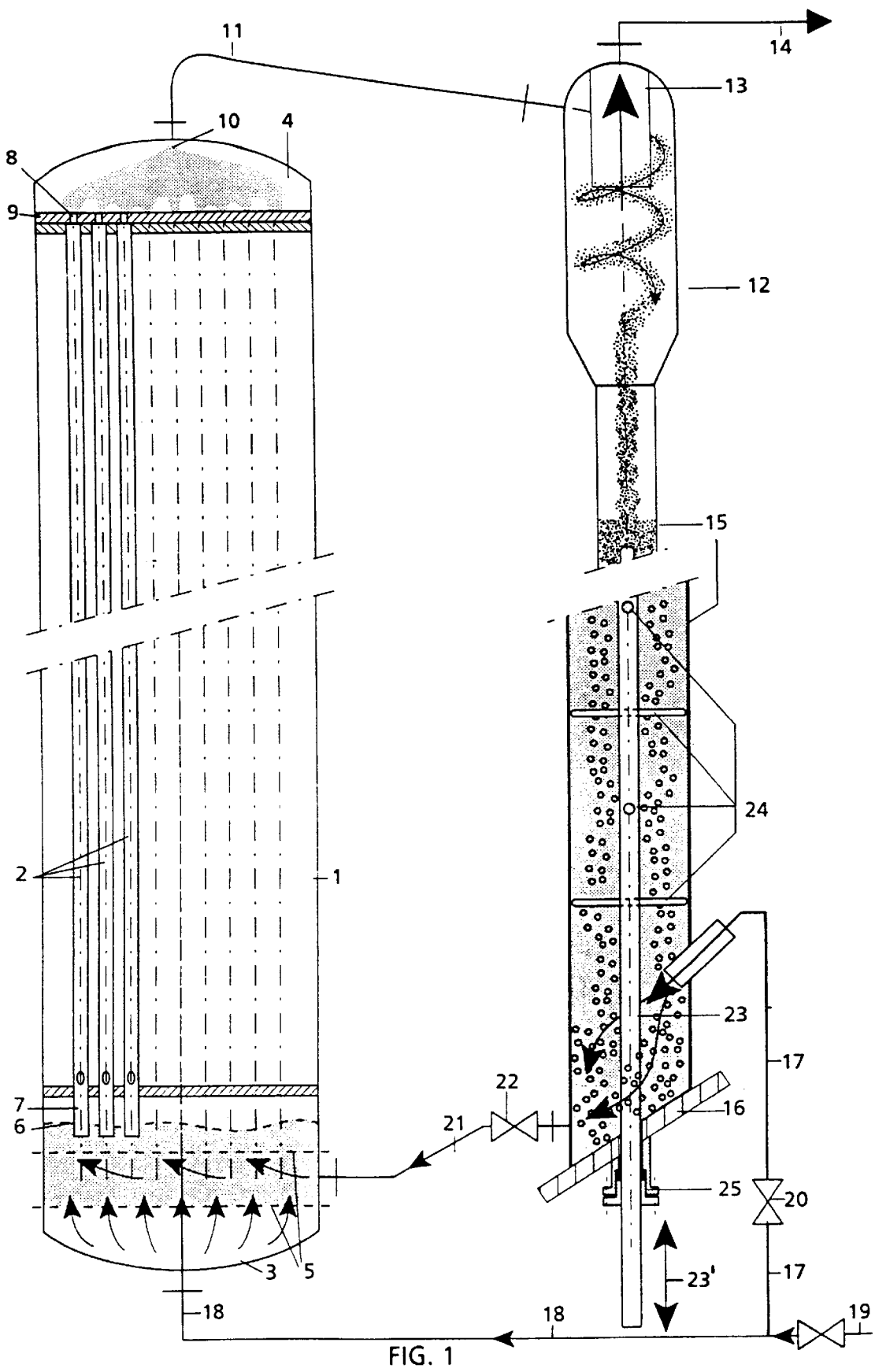
FIG. 1 shows a first embodiment of the apparatus.

FIG. 1 shows a heat exchanger consisting of a reservoir 1, in which a series of riser pipes or tubes 2 are arranged which, at the top and lower ends thereof, are accommodated in tube plates. Disposed above the top tube plate is a top box 4, into which open the riser pipes 2, while under the bottom tube plate a bottom box 3 is present, in which one or more distribution plates 5 are arranged for supporting a fluidized bed consisting of granular material. The riser pipes 2 are provided, at the bottom end thereof, with an inlet piece 6, in which openings 7 are provided. On top of or at a short distance from the top tube plate, a throttling plate 9 is arranged, provided with openings 8, which openings are in register with the openings of the riser pipes 2 but have a smaller diameter than the internal diameter of the riser pipes 2. Located in the top box 4 is an outlet opening 10, to which an outlet line 11 is connected, while the medium to be treated or heated is fed to the bottom box 3 via line 18. Obviously, between the top and bottom tube plates, the reservoir 1 comprises an inlet stub and an outlet stub for, respectively, feeding the heating medium to, and removing it from, the heat exchanger. Obviously, the heat exchanger can also be used as a cooling device.

The external recirculation system for the fluidized bed particles consists of a separating device 12, which is connected to the outlet line 11. Arranged at the bottom end of the separating device 12 is a downcomer 15 whose bottom end is closed off with a plate 16. Optionally, this plate can be mounted on the downcomer at an angle, as indicated in FIG. 1.

The vertical portion of the downcomer, in the immediate vicinity of the closing plate 16, is connected by a line 17 to the supply line 19 for the medium to be treated or heated. In line 17 a regulating valve 20 is arranged. Line 17 can be connected to the downcomer 15 at a sharp angle to make it more difficult for fluidized bed particles to flow into the line system 17, 18 of the apparatus. Also, such a sharp angle promotes the flow of the fluidized bed particles in the direction of the discharge line 21 for further transport of these particles from the downcomer 15 to the lower box 3. The discharge line 21 is preferably connected at the lowest point of the vertical portion of the downcomer 15 and connected with the bottom box 3. Through a lowest possible arrangement of the discharge line 21 in combination with the inclined position of the closing plate 16, a regular transport of fluidized bed particles is obtained with maximum thrust as a result of the height of the bed in the downcomer 15. In that discharge line 21 a valve 22 can be arranged, by which the transport of fluidized bed particles from the downcomer 15 to the bottom box 3 can be interrupted.

For viscous liquids or media containing a considerable percentage of solids in the form of crystals and/or impurities, it is sometimes necessary to promote the transport of the fluidized bed particles by proceeding, in the lower part of a possibly densely packed bed, to activate these particles with a vibrating lance 23, which extends into the bed and is provided with a number of cross-rods 24 for centering the lance in the downcomer 15. This lance 23 can, for instance via a stuffing box 25, be passed through the closing plate 16 and be driven from outside with one or more vibration motors 23.

Figure 2:
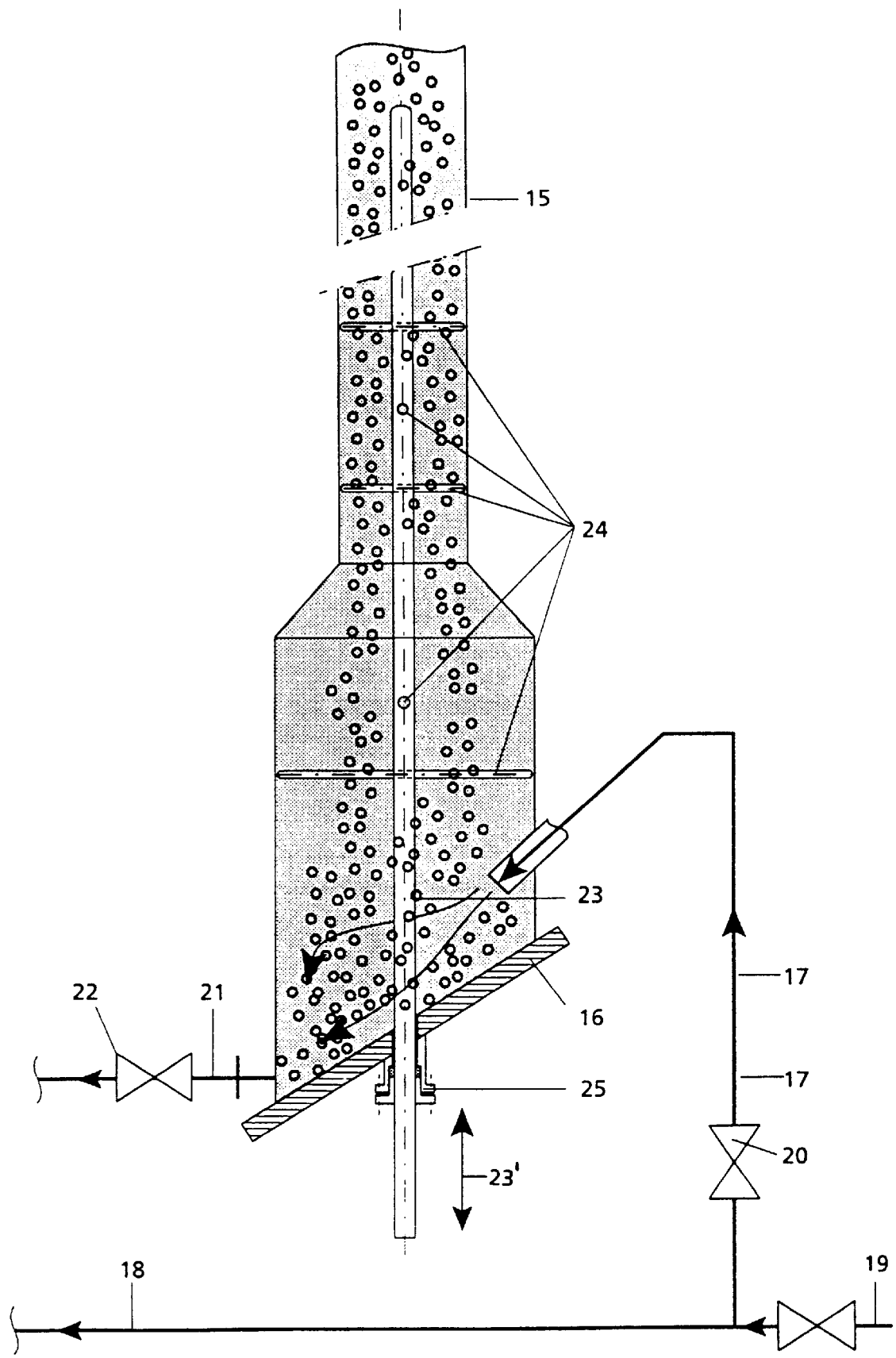
FIG. 2 shows a widened bottom end of the downcomer according to FIG. 1.

In the case of small cross sections of the downcomer 15 and/or a sufficiently high available volume flow of the medium to be heated or treated, it is sometimes recommendable to widen the bottom portion of the downcomer 15A, as indicated in FIG. 2. This facilitates connecting the feed line 17 and the discharge line 21 as well as the insertion and centering of the vibrating lance 23.

Figure 3:
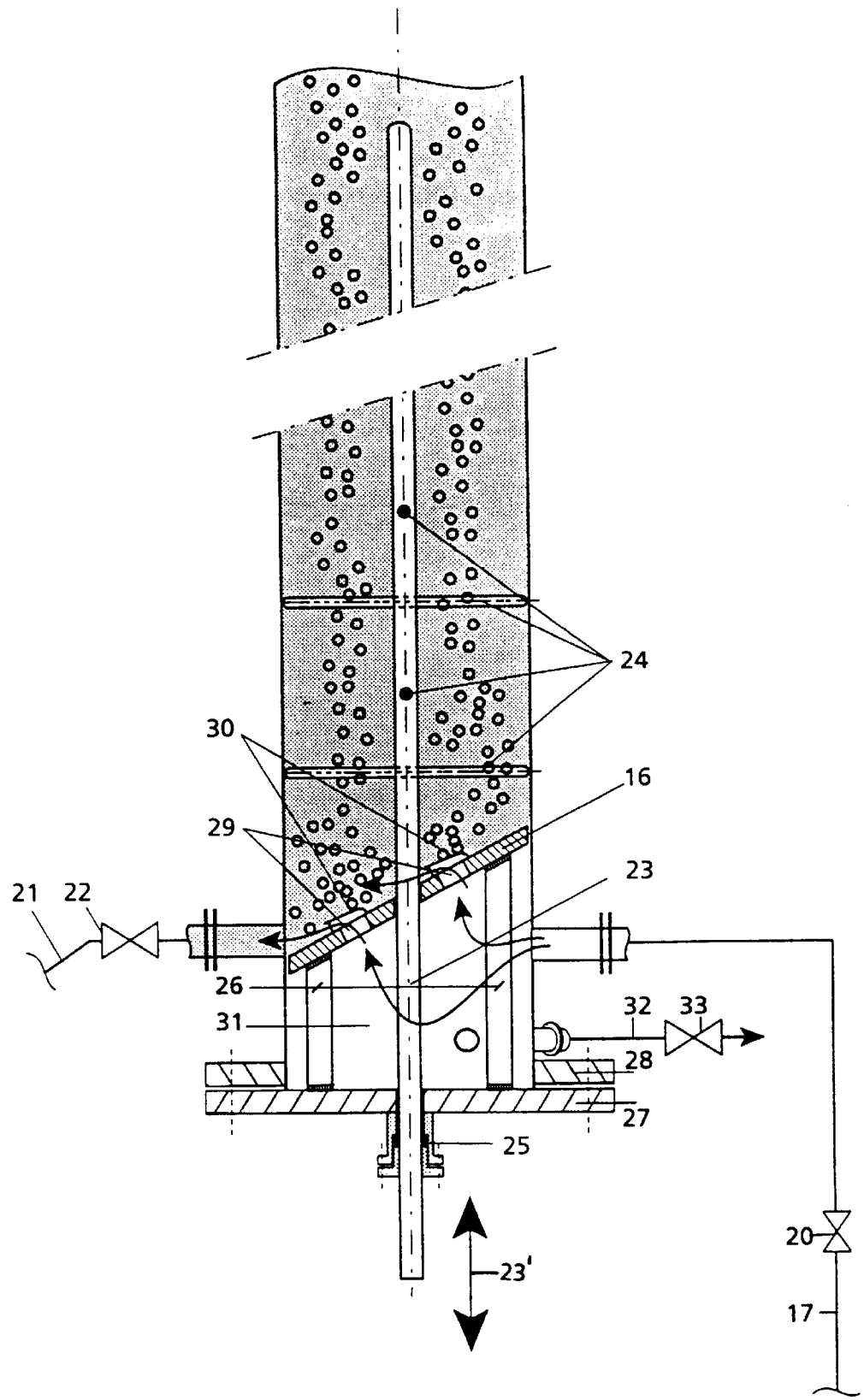
FIG. 3 is a variant of the embodiment according to FIG. 1.

In the case of large cross sections of the downcomer 15, or an enlarged lower portion of that downcomer, a design as represented in FIG. 3 is possible. The plate 16, which supports the bed with fluidized bed particles, is now placed in the downcomer 15. This plate 16 can be fixedly connected with the downcomer 15, or be placed as indicated in FIG. 3, where the plate 16 is moved into the downcomer 15 with a slight clearance and is mounted on the cover 27 by means of the supports 26. This cover 27 is connected to the downcomer 15 via the flange 28. Again, through the cover 27 and the supporting plate 16, the vibrating lance 23 provided with the cross-rods 24 is passed into the bed. The passage of the vibrating lance 23 through the cover 27 occurs via a stuffing box 25. The present design makes it possible in a simple manner to remove the supporting plate 16 and the vibrating lance 23 from the downcomer 15 for inspection. Here too, the medium to be heated or treated can be fed to the part of the downcomer 15 above the supporting plate 16, or in the manner as indicated in FIG. 3. In this last case, one or more openings 29 are provided in the supporting plate 16, through which the medium can be fed in a manner more directed towards the point where the discharge line 21 is connected to the downcomer, or more uniformly distributed over the greater cross section of the downcomer 15 to the bed. The openings 29 in the supporting plate 16 are provided with a cap 30 so shaped that the particles of the bed cannot readily flow to the space 31 under the supporting plate 16. The space under the supporting plate makes it also possible to allow larger impurities contained in the medium to settle and to discharge them via the blow-down pipe 32 with the shut-off valve 33 arranged therein.

Operating the apparatus according to the invention

All fluidized bed particles are contained in the downcomer 15 and the lower part of the separator 12. The medium to be heated or treated is supplied via lines 19, 18 to the lower box 3, is distributed over the parallel riser pipes 2, and discharged via the top box 4, line 11, separator 12 and line 14. Then the shut-off valve 22 is opened completely and the regulating valve 20 is set such that the desired amount of medium to be heated or treated - which is only a small portion of the total amount of medium supplied to the heat exchanger—is fed via the line 17 to the fluidized bed particles in the lower portion of the downcomer 15. The medium to be heated or treated follows the line of least resistance and flows to the discharge line 21 which is in communication with the bottom box 3 and entrains fluidized bed particles. In this box 3, owing to the presence of one or more distribution plates 5, inlet pieces 6 with openings 7 in combination with the throttling plate 9 mounted on top of or at a short distance from the top tube plate, a uniform distribution of the entrained fluidized bed particles over all parallel riser pipes 2 occurs. In the separator 12 the fluidized bed particles are subsequently separated from the heated or treated medium and supplied to the downcomer 15. Thus the cycle of these particles comes full circle.

Switching off the circulation of fluidized bed particles

The regulating valve 20 is closed, and then the valve 22. By temporarily increasing the amount of medium to be heated or treated that is fed to the heat exchanger via the lines 19 and 18, the filling of fluidized bed particles is flushed from the bottom box 3, pipes 2 and top box 4 and stored in the downcomer 15 and the lower part of the separator 12.

I claim:

1. An apparatus for carrying out a process, comprising a reservoir provided with upwardly directed tubes accommodated, at top and bottom ends thereof, in tube plates, the tubes being in open communication with a top box and a bottom box;

at least one distribution plate being arranged in the bottom box for supporting a fluidized bed of granular material maintainable in a quasi-stationary, fluidized condition by a medium to be treated or heated which is supplied via the bottom box and which flows through the tubes; and means for feeding fluidized bed particles back from the top box, in a form of a downcomer arranged outside the reservoir and connected, at the top end thereof, to the top box by a separating device, the bottom end of the downcomer being communicable, through switching on and off, with the bottom box of the reservoir, the downcomer being closed off at the bottom end by an inclined closing plate, and a discharge line between the downcomer and the bottom box being connected to the downcomer at a short distance above a lowest point of the inclined closing plate, while a branch line branched off from a medium feed line is present for feeding a medium substream to a particle bed resting on the inclined closing plate, in a direction of a mouth of the discharge line.

2. An apparatus according to claim 1, wherein the branch line extends into the downcomer at a sharp angle made with a horizontal plane in a downward direction, at a short distance above a highest point of the inclined closing plate.

3. An apparatus according to claim 1, wherein a lance, drivable by a vibration motor extending from underside of the downcomer through the inclined closing plate into the downcomer, the lance being provided with cross-rods for guiding the lance in the downcomer.

4. An apparatus according to claim 1, wherein the inclined closing plate is arranged inside the downcomer and is supported on a cover connected to a portion of the downcomer continuing beyond the inclined closing plate, thereby forming a settling space between the cover and the inclined closing plate.

5. An apparatus according to claim 4, wherein the inclined closing plate is provided with a series of openings covered at a top side by covering caps having an opening directed toward the discharge line, while the branch line branched off from the medium feed line opens into the downcomer under the inclined closing plate, a medium substream being guidable via the openings in the inclined closing plate and the covering caps through the particle bed in a direction of the discharge line.

6. An apparatus according to claim 2, wherein a lance drivable by a vibration motor extending from underside through the inclined closing plate into the downcomer, the lance being provided with cross-rods for guiding the lance in the downcomer.

7. An apparatus according to claim 2, wherein the inclined closing plate is arranged inside the downcomer and is supported on a cover connected to a portion of the downcomer continuing beyond the inclined closing plate, thereby forming a settling space between the cover and the inclined closing plate.

8. An apparatus according to claim 3, wherein the inclined closing plate is arranged inside the downcomer and is supported on a cover connected to the portion of the downcomer continuing beyond the inclined closing plate, thereby forming a settling space between the cover and the inclined closing plate.

9. An apparatus according to claim 6, wherein the inclined closing plate is arranged inside the downcomer and is supported on a cover connected to the portion of the downcomer continuing beyond the inclined closing plate, thereby forming a settling space between the cover and the inclined closing plate.

10. An apparatus according to claim 7, wherein the inclined closing plate is provided with a series of openings covered at the top by covering caps having an opening directed towards the discharge line, while the branch line branched off from the medium feed line opens into the downcomer under the inclined closing plate, a medium substream being guidable via the openings in the inclined closing plate and the covering caps through the particle bed in a direction of the discharge line.

11. An apparatus according to claim 8, wherein the inclined closing plate is provided with a series of openings covered at the top by covering caps having an opening directed towards the discharge line, while the branch line branched off from the medium feed line opens into the downcomer under the inclined closing plate, a medium substream being guidable via the openings in the inclined closing plate and the covering caps through the particle bed in a direction of the discharge line.

12. An apparatus according to claim 9, wherein the inclined closing plate is provided with a series of openings covered at the top by covering caps having an opening directed towards the discharge line, while the branch line branched off from the medium feed line opens into the downcomer under the inclined closing plate, a medium substream being guidable via the openings in the inclined closing plate and the covering caps through the particle bed in the direction of the discharge line.

* * * * *

UNITED STATES PATENT AND TRADEMARK OFFICE
CERTIFICATE OF CORRECTION

PATENT NO. : 6,073,682  
DATED : June 13, 2000  
INVENTOR(S) : Klaren

Page 1 of 1

It is certified that error appears in the above-identified patent and that said Letters Patent is hereby corrected as shown below:

<u>Title page,</u>  
Item [56], References Cited, U.S. PATENT DOCUMENTS,  
Insert the following reference: -- 5,676,201  10/1997  Klaren --

Signed and Sealed this

Fifth Day of February, 2002

Attest:

Attesting Officer

JAMES E. ROGAN  
*Director of the United States Patent and Trademark Office*